United States Patent [19]

Tsuchiya et al.

[11] 3,737,583

[45] June 5, 1973

[54] MAGNETIC HEAD WITH WEAR-RESISTANT SURFACE, AND METHODS OF PRODUCING THE SAME

[75] Inventors: Noriyuki Tsuchiya; Katsutoshi Amari, both of Tokyo, Japan

[73] Assignee: Sony Corporation, Tokyo, Japan

[22] Filed: Mar. 16, 1971

[21] Appl. No.: 124,758

Related U.S. Application Data

[63] Continuation-in-part of Ser. No. 58,594, July 27, 1970.

[30] Foreign Application Priority Data

Oct. 5, 1970 Japan ................................45/87352

[52] U.S. Cl. ..............................179/100.2 C, 204/16
[51] Int. Cl. ............................G11b 5/40, C23c 3/02
[58] Field of Search ..............................179/100.2 C; 340/174.1 F; 204/41, 42, 16

[56] References Cited

UNITED STATES PATENTS

| | | | |
|---|---|---|---|
| 3,061,525 | 10/1962 | Grazen | 204/16 |
| 2,642,654 | 6/1953 | Ahrens | 204/16 |
| 3,566,045 | 2/1971 | Paine | 179/100.2 C |

OTHER PUBLICATIONS

IBM Tech. Disc. Bull.: Wear Coating for a Tape Head, Groben et al., V. 9, No. 9, p. 1085; Feb. 1967.
IBM Tech. Disc. Bull.: "Copper Shield for Ferrite Heads", George et al., V. 7, No. 6, Nov. 64, p. 495.
IBM Tech. Disc. Bull.: "Rhodium Plating of Magnetic Heads", Rogers, V. 12, No. 9, Feb. 1970, p. 1400.

*Primary Examiner*—Bernard Konick
*Assistant Examiner*—Jay P. Lucas
*Attorney*—Lewis H. Eslinger, Alvin Sinderbrand and Curtis, Morris & Safford

[57] ABSTRACT

A magnetic head core element, for example, of ferrite, is provided, at least at a surface thereof subject to wear, with an electrodeposited magnetic metal layer containing a dispersed powder that is harder than the metal. The powder-containing metal layer is electrodeposited by immersing the core, preferably after deoxidizing the surface thereof to receive the layer, in an electrolyte containing a salt of the magnetic metal and a dispersion of the relatively hard powder, and passing a current between the core, acting as a cathode, and an anode also immersed in the electrolyte.

5 Claims, 8 Drawing Figures

INVENTORS
NORIYUKI TSUCHIYA
KATSUTOSHI AMARI
BY Louis H. Eglinger
ATTORNEY

INVENTORS
NORIYUKI TSUCHIYA
KATSUTOSHI AMARI

BY [signature]
ATTORNEY

MAGNETIC HEAD WITH WEAR-RESISTANT SURFACE, AND METHODS OF PRODUCING THE SAME

This invention relates to magnetic heads for magnetic recording and/or reproducing apparatus, and to methods for producing such heads. This application is a continuation-in-part of U.S. Patent Application Ser. No. 58594, filed July 27, 1970, entitled "Process of Electrodepositing Magnetic Metal Layer on Electrically Conductive Substrate," and having a common assignee herewith.

Conventional magnetic heads for use in magnetic recording and reproducing apparatus are short-lived because the surface of the magnetic head provided for contact with the magnetic tape is readily worn away. As the contact surface of the head is worn away, its contact pressure with the tape is decreased so as to increase dropout in its output and, as a result of this, the magnetic head eventually ceases to function properly. A relatively soft tape contact surface on the head is readily scratched by a magnetic powder of the magnetic tape or by dust adhering to the tape, whereby excellent recording and reproducing are rendered impossible.

With a magnetic head made of a high permeability material of great hardness such as, for example, sintered ferrite or monocrystalline ferrite, the resistance to wear is adequate to avoid the above described problem, but these ferrites are brittle and the gap portion of the head is likely to be broken off. It has also been proposed to use a laminated head core formed of a magnetic metal such as Sendust (trademark), Alfer or the like made in the shape of plates so as to prevent eddy current. In this case, the hardness and wear resistance of the head do not present any problem, but it is very difficult to provide the material in a thin sheet metal form. From the veiwpoint of workability, an iron-nickel alloy (having a Vickers hardness of 240 to 300) is the best material to use for the laminated head core, but this alloy is relatively soft, and hence has poor wear resistance.

An object of this invention is to provide magnetic heads having a tape contact surface of excellent wear resistance, and which exhibit magnetic characteristics at least equal and preferably superior to those of conventional heads.

Another object is to provide a method by which magnetic heads, as aforesaid, may be conveniently and economically mass produced.

A further object is to provide the core of a magnetic head, for example, of ferrite, with a storngly adherent, wear-resistant layer to define the tape contacting surface of the head.

In accordance with an aspect of this invention, the core of a magnetic head is provided, at least at the surface thereof subject to wear, for example, by reason of its contact with magnetic tape, with an electrodeposited magnetic metal layer having dispersed therein a fine powder that is substantially harder than the magnetic metal. The electrodeposition of such powder containing magnetic metal layer is effected, according to the invention, by immersing the magnetic head core in an electrolyte of at least one salt of the magnetic salt, which electrolyte has dispersed therein said powder which is insoluble in the electrolyte, and the immersed core is then used as the cathode for the electrodeposition thereon of the magnetic metal.

It is a feature of this invention to deoxidize the surface of the core before the electrodeposition thereon of the magnetic metal layer, whereby to improve the adhesion of the latter to the core.

Another feature of this invention involves the electrodeposition on the core of a magnetic metal layer of high permeability under the layer which has relatively hard powder dispersed therein.

Still another feature of the invention consists in annealing the core after the electrodeposition thereon of the magnetic metal layer or layers, whereby to further improve the magnetic characteristics of the resulting head.

The above, and other objects, features and advantages of the invention will be apparent in the following detailed description of illustrative embodiments thereof which is to be read in connection with the accompanying drawings, wherein.

Figure 2A:
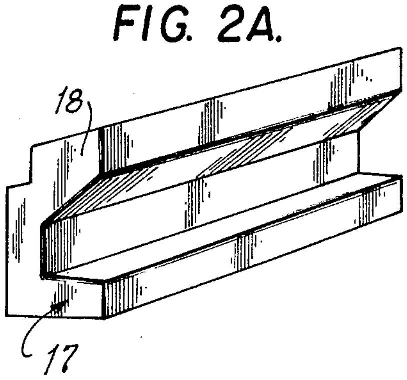
FIGS. 2A, 2B, 2C and 2D are schematic perspective views illustrating successive stages in the production of a magnetic head according to an embodiment of this invention.
Figure 2C:
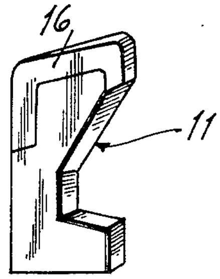
Figure 2B:
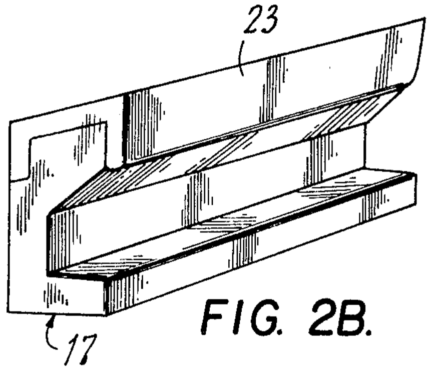
Figure 2D:
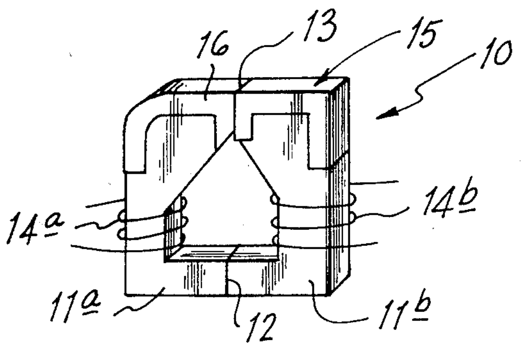

Referring to the drawings in detail, and initially to FIG. 2D thereof, it will be seen that a magnetic recording and reproducing head 10 according to this invention includes a core made up of monolithic core elements 11*a* and 11*b* of a magnetic material, for example, ferrite, and which are generally of C-shaped configuration, as shown. The core elements 11*a* and 11*b* are arranged to face each other and are joined at one end, as at 12, for example, by a suitable adhesive, to define a gap 13 between the other ends of the core elements. Coils 14*a* and 14*b* are wound on core elements 11*a* and 11*b*, respectively, and the head 10 functions in the usual manner to either magnetically record or reproduce signals on a magnetic tape or other magnetic medium moving relative to the head across a contact surface 15 of the latter having the gap 13 therein.

In accordance with the present invention, the tape contacting surface 15 of the magnetic head core is constituted by a layer 16 of electrodeposited magnetic metal having dispersed therein a fine powder which is preferably also magnetic and which is substantially harder than the electrodeposited metal and insoluble in a plating bath or electrolyte from which layer 16 is electrodeposited directly onto the core elements, as hereinafter described in detail. The powder thus dispersed in magnetic metal layer 16 may be a ferrite powder, for example, a $ZnMn(FeO_4)_2$ powder, or other hard magnetic powders available commercially under the tradenames Sendust, Alfer and Supermalloy, or the like. The hard powder dispersed in the layer of magnetic metal may also be non-magnetic, for example, of alumina, kaolin, powdered or pulverized glass, talc, barium sulfate, strontium carbonate, titanium oxide, or zirconium oxide, but in that case the magnetic properties are not as desirable as when the dispersed powder is magnetic.

In any case, by reason of the hard dispersed powder in the layer 16, the tape contacting surface 15 constituted thereby has a wear-resistance that is comparable to that of a core formed entirely of ferrite. Further, since the electrodeposited layer 16 of a magnetic metal, such as, for example Permalloy (Fe-Ni alloy), defines the tape contacting surface 15 at which the gap 13 opens, the head 10 avoids the tendency of existing heads formed with cores that are entirely of ferrite to fracture or break-away at the gap.

In making the magnetic head 10 according to this invention, an elongated bar 17 of ferrite or other magnetic material is suitably formed with a cross-section corresponding to the desired shape of the core elements 11*a* and 11*b*, for example, the C-shaped cross-section as shown on FIG. 2A. The surface of bar 17 is then deoxidized, either chemically, electrolytically or with a deoxidizing gas. For example, the bar 17 may be deoxidized by its placement in a flow of hydrogen which is supplied at the rate of about 2 liters per minute and at a temperature of about 200° to 800° C.

Figure 1:
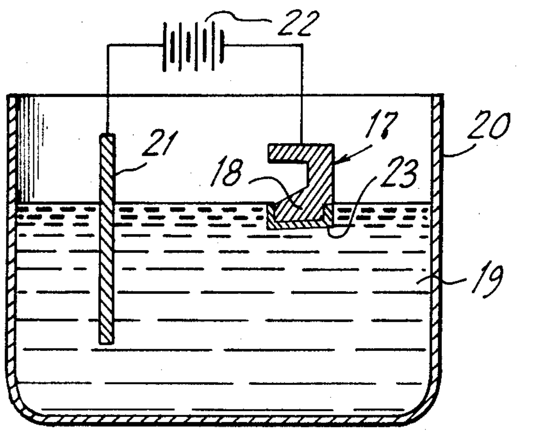
FIG. 1 is a schematic view of apparatus used in one stage of the method according to this invention for producing magnetic heads.

After being deoxidized, as described above, the bar 17 has its portion 18 immersed as a cathode in a plating bath 19 or electrolyte of at least one salt of a magnetic metal contained in a vessel 20 (FIG. 1). Examples of suitable plating baths are as follows:

EXAMPLE I

| | |
|---|---|
| Nickel sulfamate | 400 g/l |
| Ferrous chloride | 20 g/l |
| Hydroxylamine hydrochloride | 6 g/l |
| Boric Acid | 35 g/l |
| Sodium lauryl sulfate | 1 g/l |

EXAMPLE II

| | |
|---|---|
| Nickel sulfamate | 470 g/l |
| Ferrous sulfate | 40 g/l |
| Hydroxylamine phosphate | 6 g/l |
| Sodium ascorbate | 5 g/l |
| Sodium lauryl sulfate | 1 g/l |
| Cyquest (trademark, dispersing agent) | 0.1 g/l |
| FX-161 (trademark, surface-active agent) | 6 g/l |

EXAMPLE III

| | |
|---|---|
| Nickel sulfamate | 400 g/l |
| Ferric chloride | 42 g/l |
| Ammonium chloride | 20 g/l |
| | (pH:3.0) |

EXAMPLE IV

| | |
|---|---|
| Nickel sulfamate | 473 g/l |
| Boric acid | 30 g/l |
| Ferrous sulfate | 20–25 g/l |
| Hydroxylamine sulfate | 2–6 g/l |
| Sodium lauryl sulfate | 0.05–1 g/l |
| | (pH:1.0) |

EXAMPLE V

| | |
|---|---|
| Nickel sulfamate | 470 g/l |
| $FeCl_2$ | 25 g/l |
| Boric acid | 30 g/l |
| Sulfamic acid | pH modifier |
| Ascorbic acid | 5 g/l |
| Sodium lauryl sulfate | 0.01 g/l |
| Cyquest (trademark, dispersing agent) | 0.05 g/l |

In accordance with the present invention, a hard preferably magnetic powder, for example, a ferrite powder, such as $ZnMn(FeO_4)_2$, having a grain size of about 10 microns is mixed in any of the above plating baths in an amount of about 100 g per liter of the bath, and the plating bath 2 is well agitated so as to disperse the ferrite powder uniformly therein. Then, an anode 21 formed of carbon is immersed in the plating bath 19 along with the portion 18 of bar 17 acting as a cathode, as previously described, and then a current is passed between the cathode and anode, as from an electric source 22. Thus, a magnetic alloy, that is, permalloy (Fe-Ni alloy) is electrodeposited on the surface of the bar portion 18 in the form of a magnetic metal layer 23 about 20 to 70 microns thick. The layer 23 thus obtained is a magnetic metal alloy in which the magnetic powder, in this example ferrite, is dispersed.

The bar 17 with the layer 23 thereon (FIG. 2B) is removed from the plating bath and is cut in planes extending transversely to its longitudinal direction to provide a plurality of core elements 11 (FIG. 2C). Two of such core elements 11*a* and 11*b* (FIG. 2D) are finally assembled together as described above to provide the core of head 10.

A magnetic head 10 produced in the foregoing manner has mechanical and magnetic characteristics that are superior to such characteristics of heads that are otherwise made. For example, when the surface of bar 17 is deoxidized, as described above, prior to the electrodeposition of the layer 23 thereon, such layer can withstand a loading of 5 Kg/cm², in the direction perpendicular to the surface at which layer 23 is bonded to bar 17, without separation of layer 23 from bar 17. However, if the deoxidation step is omitted, there is almost no resistance to separation of layer 23 from bar 17 when subjected to a loading or pull in the mentioned direction. The above indicates that, by reason of the prior deoxidation, the alloy of layer 23 is strongly and easily combined chemically with the underlying material of bar 17; whereas, in the absence of the deoxidizing step, the alloy of layer 23 cannot combine chemically with the oxide on the surface of bar 17.

It has also been found that the magnetic metal layer 16 containing a hard magnetic powder, for example, ferrite powder, results in a far smaller loss in sensitivity than would be caused by such a layer without the powder dispersed therein. More specifically, in the magnetic head 10 according to this invention, the layer 16 of permalloy containing ferrite powder on the core elements 11*a* and 11*b* of ferrite, results in a sensitivity loss of 0.2 dB, as compared with the head without the layer 16. However, the same layer without the ferrite powder dispersed therein results in a sensitivity loss of more than 3.0 dB.

Figure 3:
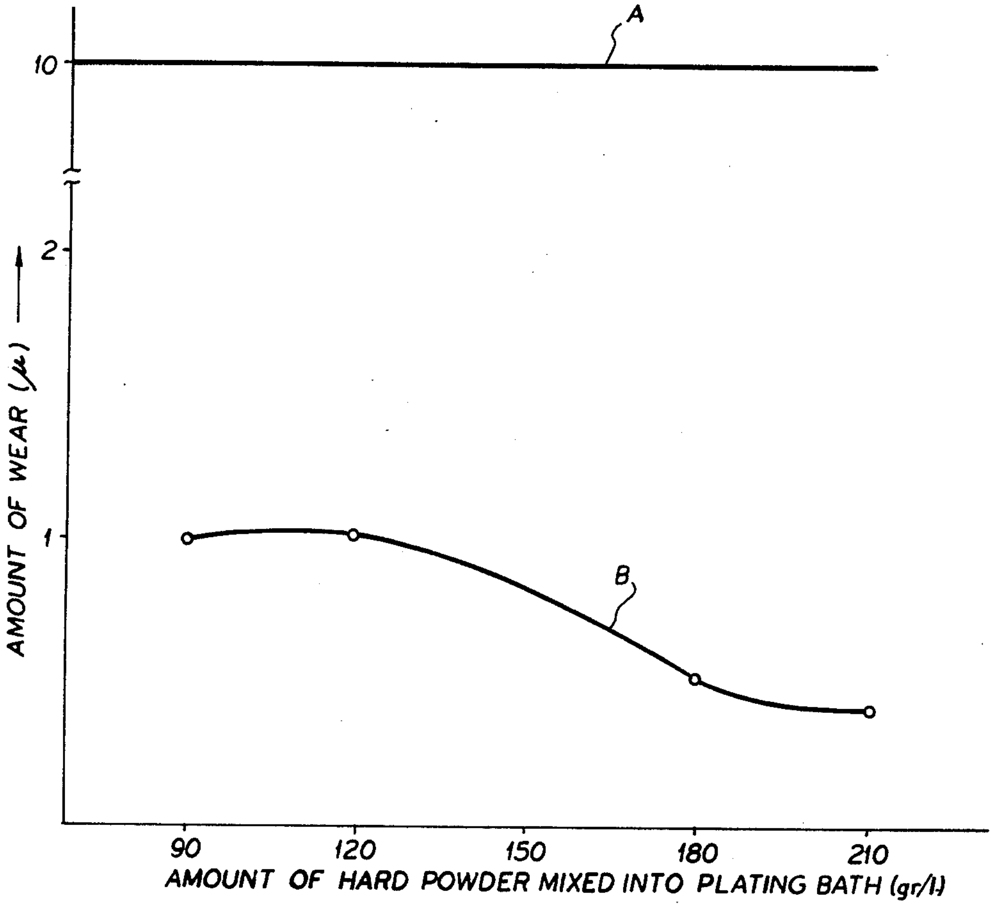
FIGS. 3 and 4 are graphs showing characteristics of a magnetic head produced in accordance with the embodiment of FIGS. 2A–2D.

As previously mentioned, the layer 16 both resists breakage at the gap 13, and provides a high degree of resistance to wear at the tape contact surface 15. Thus, for example, a conventional magnetic head of permalloy is worn away to a depth of 10 microns at its tape contact surface in response to the movement of a magnetic tape across such surface for a period of 200 hours, as indicated by the curve A on FIG. 3. On the other hand, as indicated by the curve B on FIG. 3, a magnetic head according to this invention, that is, having a layer 16 of permalloy with ferrite powder dispersed therein, exhibits a wear of only 0.5 to 1.0 micron under the same conditions, and depending on the amount of ferrite powder in the plating bath. Such enhanced wear resistance of the head according to this invention is comparable to that of a head having a core of only ferrite which wears to a depth of 0.6 mm after 10,000 hours of contact with a moving magnetic tape.

Further, with a magnetic head according to this invention, it has been found that its initial permeability $\mu_o$, residual magnetic induction or remanence Br, saturated magnetic flux density Bs and coercive force Hc are respectively 7,000 to 8,000, 3,500 to 4,000 gauses, 4,000 to 6,000 gauses and 0.05 oersteds. As contrasted with the foregoing, in the case of a core of ferrite $(ZnMn(FeO_4)_2)$ alone, the initial permeability $\mu_o$, residual magnetic induction or remanence Br, saturated magnetic flux density Bs and coercive force Hc are respectively 8,000 to 4,000, 800 to 2,000 gauses, 3,000 to 4,500 gauses and 0.01 to 0.05 oersteds.

As will be seen from the above, the wear resistance of the powder-containing magnetic alloy produced by the electrodeposition method of this invention is favorably comparable to that of the ferrite, and further its magnetic characteristics such as, for example, the initial permeability $\mu_o$ and so on, are almost equal to those of the ferrite.

Figure 4:
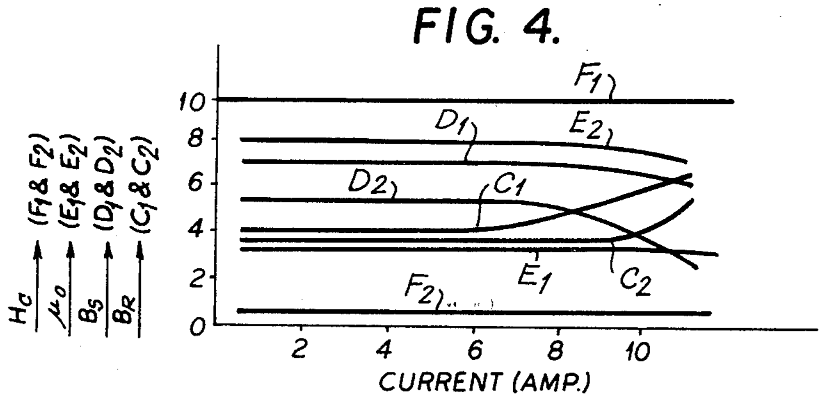

The advantages of employing a magnetic powder, such as, ferrite powder, rather than a non-magnetic powder, for dispersion in the electrodeposited magnetic metal layer will be apparent from FIG. 4 which compares the magnetic characteristics of a head according to Example V, that is, having a ferrite core with a layer 16 of a nickel-iron alloy containing ferrite powder, with the magnetic characteristics of an otherwise identical head in which the same amount of alumina powder of 10 micron particle size is substituted for the ferrite powder in the plating bath. In both instances, the plating bath contained 100 g. per liter of the respective ferrite or alumina powder and the temperature of the bath was 40°C. On FIG. 4, the curves $C_1$, $D_1$, $E_1$ and $F_1$ respectively indicate the residual magnetic induction or remanence Br, the saturated magnetic flux density Bs, the initial permeability $\mu_o$ and the coercive force Hc of the head having alumina powder dispersed in its layer 16, and curves $C_2$, $D_2$, $E_2$ and $F_2$ respectively indicate the corresponding characteristics of the head having ferrite powder dispersed in its electrodeposited layer. For all of the curves, the abscissa represents the electrodepositing current in amperes: while the ordinate represents the remanance Br for curves $C_1$ and $C_2$ on the order of $10^3$; the saturated magnetic flux density Bs for curves $D_1$ and $D_2$ on the order of $10^3$; the initial permeability $\mu_o$ for the curves $E_1$ and $E_2$ on the order of $10^3$; and the coercive force Hc for the curves $F_1$ and $F_2$ on the order of $10^{-1}$. Of course, the ordinate represents different units for the several curves.

It is further preferred that the core elements 11 shown on FIG. 2C be annealed prior to their assembly to form the head of FIG. 2D. Such annealing may be effected by heating in a vacuum to a temperature between approximately 400° and 900°C. for from 1 to 3 hours. As a result of such annealing, the magnetic head according to this invention has the following characteristics for various concentrations of ferrite powder dispersed in the plating bath:

TABLE 1

| Powder Dispersed g/l | $\mu_o$ (1 KHz) | Bs (gauss) | Br (gauss) | Hc (gauss) |
|---|---|---|---|---|
| 5 | 10350 | 9600 | 5000 | 0.070 |
| 10 | 9700 | 7800 | 4750 | 0.080 |
| 20 | 9900 | 7900 | 4500 | 0.080 |
| 30 | 9700 | 7550 | 4700 | 0.084 |
| 90 | 8200 | 7100 | 4330 | 0.074 |
| 120 | 10450 | 8050 | 5050 | 0.083 |
| 150 | 9560 | 8050 | 4600 | 0.087 |
| 200 | 21000 | 8050 | 4700 | 0.072 |

If the annealing step is omitted, the corresponding magnetic characteristics are as follows:

TABLE 2

| Powder dispersed g/l | $\mu_o$ (1 KHz) | Bs (gauss) | Br (gauss) | Hc (gauss) |
|---|---|---|---|---|
| 5 | 7400 | 5800 | 1800 | 0.39 |
| 10 | 6900 | 5400 | 3350 | 0.35 |
| 20 | 7940 | 5800 | 2900 | 0.34 |
| 30 | 7840 | 5550 | 2500 | 0.42 |
| 90 | 7800 | 5170 | 2300 | 0.39 |
| 120 | 8090 | 5300 | 1650 | 0.39 |
| 150 | 6650 | 4800 | 1970 | 0.39 |
| 200 | 17800 | 4600 | 1700 | 0.37 |

From tables 1 and 2 above, it is apparent that the annealed head exhibits magnetic characteristics that are more favorable than the head that has not been annealed.

In all of the above examples of the invention employing a magnetic powder dispersed in the electrodeposited magnetic metal layer, such magnetic powder has been ferrite. However, the magnetic powder need not be limited specifically to ferrite, and any other magnetic powder of desired magnetic characteristics can be employed.

As previously mentioned, other usable magnetic powders include Sendust, Alfer, Supermalloy and the like. The mechanical and magnetic characteristics of these magnetic substances are as shown in the following Table 3. Accordingly, the characteristics of the electrodeposited layers having such substances dispersed as powders therein in accordance with this invention approximate those indicated below.

TABLE 3

| Magnetic powder | Wear (per 1,000 hrs.) | Hardness (Vickers hardness) | μo | Bs, gauss | Br, gauss | Hc, oersted |
|---|---|---|---|---|---|---|
| Sendust 5Al:10Si | 0.5 | 550–580 | 50,000 | 8,500 | 3,260 | 0.018 |
| Alfer 13Al | | <400 | 600–4,100 | 12,000 | 10,000 | 0.66 |
| Supermalloy 5Mo:79Ki | 0.4–1.0 | 300–550 | 100,000 | 7,900 | 7,000 | 0.002 |

Figure 5:
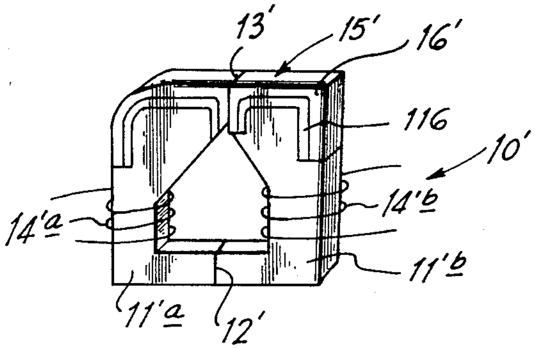
FIG. 5 is a perspective view similar to that of FIG. 2D, but showing another embodiment of the invention.

Referring now to FIG. 5, it will be seen that the magnetic head 10′ according to this invention, as there shown, is generally similar to the head 10 described above with reference to FIG. 2D. Thus, the head 10′ includes a core made up of monolithic core elements **11′*a* and 11′*b* of a magnetic material, for example, ferrite, and which are generally of C-shaped configuration. As before, the elements 11′*a* and 11′*b* are joined at 12′ to define a gap 13′ opening at the tape contacting surface 15′, and coils 14′*a* and 14′*b* are wound on the core elements 11′*a* and 11′*b*. Once again, the tape contacting surface 15′ is constituted by a layer 16′ of electrodeposited metal having dispersed therein a fine powder which is preferably magnetic and substantially harder than the magnetic metal of layer 16′. However, in the head 10′, a layer 116 of magnetic metal of high permeability is electrodeposited under the layer 16′**.

Thus, in the head 10', the layer 116 can provide the desired high-permeability, while the layer 16 affords the desired wear-resistance, whereby the head has a most desirable combination of magnetic and mechanical characteristics.

The head 10' may be produced in substantially the same manner as described above with reference to the head 10. However, in this case, the bar 17 is first immersed, as a cathode, in a plating bath, for example, as disclosed in Example 1–5, from which the magnetic powder has been omitted and the layer 116 is electrodeposited. Then the bar 17 with the layer 116 thereon is immersed in the same plating bath, but with ferrite powder or other magnetic powder therein, to electrodeposit the layer 16' on the layer 116.

It will be understood that, in the head 10', it is preferred to deoxidize the surface of bar 17 before the electrodeposition of the first layer therein, and also to anneal the head with the layers 116 and 16' thereon, as previously described.

Although illustrative embodiments of the invention have been described in detail herein, it is to be understood that the invention is not limited to those precise embodiments, and that a person skilled in the art may make various changes and modifications therein without departing from the scope or spirit of the invention.

What is claimed is:

1. A magnetic head comprising a ferrite core having an integral deoxidized outer portion and a wear-resistant tape contacting surface on said deoxidized outer portion and being constituted by a layer of electrodeposited iron-nickel alloy with a fine powder dispersed therein which is harder than said iron-nickel alloy.

2. A magnetic head according to claim 1, in which an electrodeposited magnetic metal layer of high permeability underlies said layer constituting the wear-resistant surface of the core.

3. A magnetic head according to claim 2, in which said layer of high permeability is of the same iron-nickel alloy as is included in said layer constituting the wear-resistant surface.

4. A magnetic head according to claim 1, in which said powder is magnetic.

5. A magnetic head according to claim 4, in which said magnetic powder is ferrite.

* * * * *